(12) United States Patent
Thebault et al.

(10) Patent No.: US 6,740,408 B2
(45) Date of Patent: May 25, 2004

(54) PROTECTING COMPOSITE MATERIAL PARTS AGAINST OXIDATION

(75) Inventors: Jacques Thebault, Bordeaux Cauderan (FR); Pascal Diss, Le Haillan (FR); Michel Laxague, Bordeaux Cauderan (FR); Eric Lavasserie, Begles (FR)

(73) Assignee: SNECMA Propulsion Solide, Le Haillan Cedex (FR)

( * ) Notice: Subject to any disclaimer, the term of this patent is extended or adjusted under 35 U.S.C. 154(b) by 0 days.

(21) Appl. No.: 10/179,037

(22) Filed: Jun. 25, 2002

(65) Prior Publication Data

US 2003/0194574 A1 Oct. 16, 2003

(30) Foreign Application Priority Data

Apr. 9, 2002 (FR) .............................. 02 04410

(51) Int. Cl.$^7$ .............................. B05D 1/12; B05D 1/38; C04B 35/58
(52) U.S. Cl. .................. 428/408; 428/698; 427/201; 427/202; 427/204; 427/397.7; 427/419.7
(58) Field of Search ................. 427/226–228, 427/202–204, 201, 376.1–376.2, 397.7, 374.7, 419.7, 427, 429, 590; 428/408, 698, 384

(56) References Cited

U.S. PATENT DOCUMENTS

| 4,613,522 A | 9/1986 | Vasilos | ....................... 427/202 |
| 4,838,346 A | * 6/1989 | Camarda et al. | |
| 4,931,413 A | * 6/1990 | Weir et al. | |
| 5,188,989 A | 2/1993 | Winkelbauer et al. | ......... 501/17 |
| 5,298,311 A | 3/1994 | Bentson et al. | ............. 428/216 |
| 5,420,084 A | 5/1995 | Morel | ......................... 501/96 |
| 5,536,574 A | * 7/1996 | Carter | |
| 5,622,751 A | * 4/1997 | Thebault et al. | |
| 5,736,477 A | 4/1998 | Blough et al. | ................. 501/99 |
| 5,853,821 A | * 12/1998 | Balhadere et al. | |

FOREIGN PATENT DOCUMENTS

| EP | 0 550 305 A1 | 7/1993 |
| EP | 0 609 160 A1 | 8/1994 |
| EP | 1 043 290 A1 | 10/2000 |

* cited by examiner

*Primary Examiner*—Fred J. Parker
(74) *Attorney, Agent, or Firm*—Weingarten, Schurgin, Gagnebin & Lebovici LLP

(57) ABSTRACT

An oxidation-sensitive composite has applied thereto a composition comprising a mixture of boride powder constituted for the most part of $TiB_2$, at least one vitreous refractory oxide powder constituted for the most part by a mixture of borosilicate glass, and a binder containing a ceramic-precursor resin. The resin is cured and is subsequently transformed into a ceramic by heat treatment or during first exposure of the coated part to high temperatures.

23 Claims, 3 Drawing Sheets

PROTECTING COMPOSITE MATERIAL PARTS AGAINST OXIDATION

BACKGROUND OF THE INVENTION

The invention relates to applying a protective coating against oxidation on thermostructural composite material parts containing carbon or some other material that is sensitive to oxidation at high temperature, such as boron nitride.

Thermostructural composite materials are characterized by their mechanical properties which make them suitable for constituting structural parts, and by their ability to conserve these mechanical properties at high temperature. They are constituted by fiber reinforcement densified with a matrix of refractory material which fills the pores in the fiber reinforcement, at least in part. The materials constituting the fiber reinforcement and the matrix are typically selected from carbon and ceramics. Examples of thermostructural composite materials are carbon/carbon (C/C) composites, and ceramic matrix composites (CMCs) such as carbon fiber reinforcement with a silicon carbide matrix (C/SiC) or carbon fiber reinforcement with a matrix comprising a mixture of carbon and silicon carbide (C/C—SiC), or indeed a C/C composite silicided by being caused to react with Si (C/C—SiC—Si).

Thermostructural composite materials very frequently contain carbon, whether constituting the fibers, constituting at least part of the matrix, or indeed constituting an interphase coat formed on the fibers to provide them with adequate bonding with the matrix. Thus, whenever such parts are used in an oxidizing atmosphere and at a temperature above 350° C., protection against oxidation is essential in order to avoid rapid deterioration of parts made out of such composite materials. This also applies when boron nitride (BN) is used as an interphase component between ceramic fibers and matrix.

There exists abundant literature concerning the formation of anti-oxidation protective coatings for parts made at least in part out of carbon or out of graphite.

For thermostructural composite material parts containing carbon, and in C/C composite parts, it is known to form a protective coating at least in part out of a composition containing boron, and more particularly a composition having self-healing properties. A "self-healing" composition is a composition which, by passing to a viscous state at the temperature at which parts are used, can serve to plug any cracks which might form in the protective coating. Otherwise, in an oxidizing atmosphere, such cracks give the oxygen of the ambient medium access to reach the composite material and to infiltrate into the residual pores thereof. Self-healing compositions in widespread use are boron glasses, in particular borosilicate glasses. Reference can be made for example to document U.S. Pat. No. 4,613,522.

It is also known from document EP 0 609 160 to form a coating for protection against oxidation by means of a mixture of zirconium diboride $ZrB_2$, colloidal silica $SiO_2$, and silicon carbide SiC. It should be observed that in that document, it is recommended to avoid using titanium diboride $TiB_2$.

The oxide $B_2O_3$ is the essential element in boron-containing protective compositions. It has a melting temperature which is relatively low (about 450° C.) and it is good at wetting the carbon-containing surface to be protected. Nevertheless, when the temperature becomes higher than 1000° C., $B_2O_3$ volatilizes and its ability to protect diminishes.

In addition, because its melting temperature is relatively low, the oxide $B_2O_3$ can be eliminated from the surfaces of parts by blowing from a flow of gas passing over said surface. Furthermore, $B_2O_3$ is hydrophilic and forms boron hydroxides which begin to volatilize at relatively low temperatures (from 150° C.).

However, there exists a need to protect parts that are used in a moist environment at high temperature.

This applies in particular to the diverging portions of nozzles for hydrogen-and-oxygen rocket engines where the water vapor produced and ejected through the nozzle creates not only an environment that is moist and oxidizing, but also sweeps the surface of the inside wall of said diverging portion.

This also applies to C/C composite brake disks as used in aviation when landing and taxiing on wet runways.

Document EP 0 550 305 discloses a method of making a coating for protecting composite material parts that contain carbon in order to provide them with resistance against abrasion and against blowing. That method comprises forming a coating on the parts out of a mixture of a non-oxide ceramic powder (such as a carbide, nitride, boride, or silicide powder), a refractory oxide powder having healing properties by forming a glass (such as a powder of a silica-alumina mixture), and a binder constituted by a resin that is a ceramic precursor (e.g. a polycarbosilane, polytitanocarbosilane or similar, polysilazane, polyvinylsilane, or silicone resin), the precursor subsequently being transformed into ceramic. A protective coat is obtained with a non-oxide ceramic phase and a healing phase constituting two interpenetrating lattices, thereby offering the desired resistance both to abrasion and to blowing.

OBJECT AND SUMMARY OF THE INVENTION

An object of the invention is to provide a method of providing protection against oxidation for a part made of composite material, which method provides a high degree of effectiveness, particularly in a moist environment.

This object is achieved by a method comprising: applying on the part a composition containing a mixture of at least one boride in powder form, at least one vitreous refractory oxide in powder form having healing properties by forming a glass, and a binder comprising a resin that is a precursor for a refractory ceramic; and curing the resin, in which method, said boride powder is constituted for the most part by titanium diboride $TiB_2$, and said powder of at least one vitreous refractory oxide comprises for the most part a borosilicate mixture.

The term "borosilicate mixture" or "borosilicate system" is used herein to mean an association of boron oxide and of silicon oxide, i.e. a ($B_2O_3$, $SiO_2$) system.

In addition to titanium diboride $TiB_2$, the boride powder may include at least one other metal boride such as aluminum boride, e.g. $AlB_2$ and/or $AlB_{12}$, and/or silicon boride such as $SiB_4$ and/or $SiB_6$.

Surprisingly, and as can be seen from the examples given in the description below, such a composition provides effective and durable protection against oxidation, including in a moist atmosphere, and in spite of the presence of $B_2O_3$.

The binder can be constituted by a polymer that is a precursor for a ceramic selected from: polycarbosilanes, polytitanocarbosilanes, polysilazanes, polyvinylsilanes, and silicone resins. The polymer is preferably cured in air at a temperature below 400° C.

Advantageously, a composition is applied to the part so that after curing it presents a thickness lying in the range 200 micrometers ($\mu$m) to 700 $\mu$m.

Also advantageously, the composition is applied to the part as a plurality of successive coats, with intermediate curing.

The ceramization (transformation) of the refractory ceramic precursor takes place at high temperature, ceramization can be performed after the composition has been applied and before first use of the part by heat treatment at a temperature which is typically higher than 600° C., and in an inert atmosphere. Ceramization can also be performed at higher temperature in an oxidizing atmosphere, preferably at a temperature higher than or equal to 800° C. Ceramization is then performed over a shorter duration, e.g. by flash oxidation in a furnace containing air, or by flame treatment in air, or by direct inductive coupling with a heating inductor when the nature and the shape of the part make that possible.

In a variant, ceramization can be performed directly during first use of the part when operating at high temperature.

When the part to be protected is made of C/C composite, the composition can be applied to the part directly, or after a refractory undercoat has been formed, e.g. made of SiC. Such an undercoat serves to form an additional barrier providing protection against oxidation, but it is subject to cracking. The undercoat can be formed reactively, e.g. using SiO gas, by chemical vapor deposition or infiltration, or by ceramizing a precursor, or it can be obtained by siliciding the C/C composite with silicon, giving rise to an undercoat of the SiC—Si type.

According to another feature of the method of the invention, it includes a prior step of impregnating the part with a composition containing at least one phosphate, for example aluminum or magnesium phosphate, impregnation being followed by heat treatment at a temperature higher than 600° C.

In order to make it easier to apply, and in particular in order to adjust its viscosity, the composition preferably contains a solvent for the ceramic precursor resin. The composition can be applied by coating using a paint brush or a spray gun, and then eliminating the solvent by drying, and then curing the resin.

In order to increase the ability of the protective coating to withstand blowing, the composition can include additional fillers in the form of short fibers or "whiskers" of refractory material, e.g. of ceramic material such as silicon carbide or alumina.

The invention also provides a composite material part containing carbon and provided with a protective coating as obtained by the method defined above. The part can be a C/C composite friction part or a diverging portion of a rocket engine nozzle.

BRIEF DESCRIPTION OF THE DRAWINGS

The invention will be better understood on reading the following detailed description given by way of non-limiting indication. Reference is made to the accompanying drawings, in which.

DETAILED DESCRIPTION OF IMPLEMENTATIONS

Figure 1:
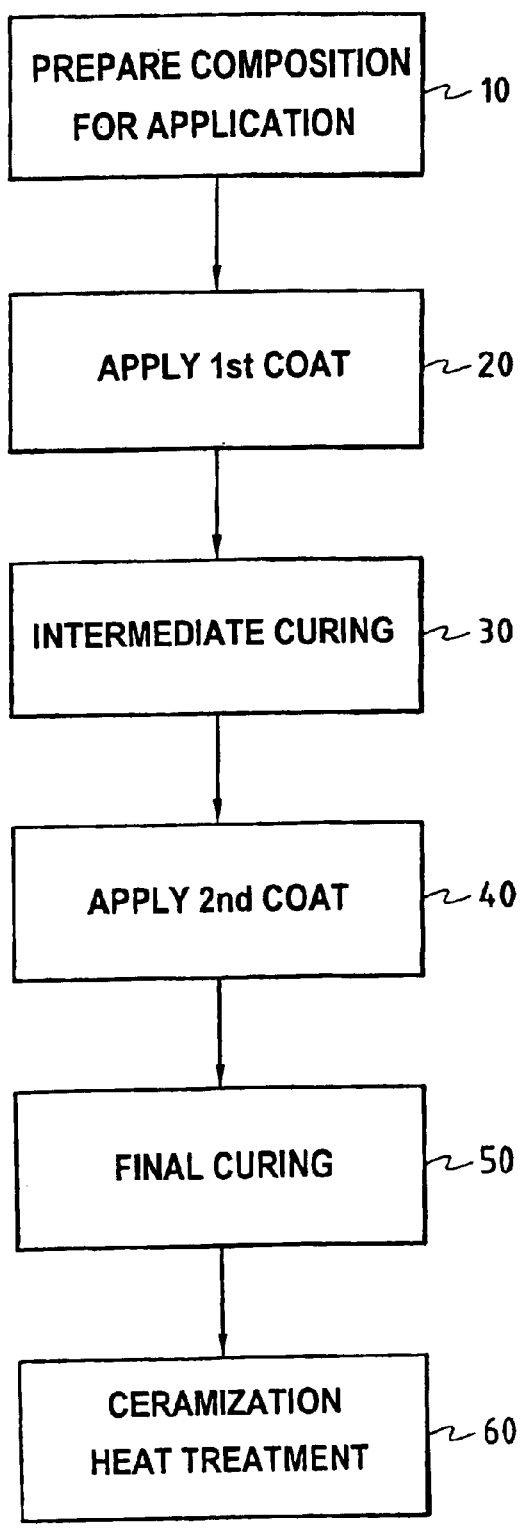
FIG. 1 is a flow chart showing the successive steps in forming a coating for providing protection against oxidation in an implementation of the invention.

The invention is described below in its application to protecting C/C composite material parts against oxidation, in particular parts constituting the diverging portions of rocket engine nozzles and friction parts such as airplane brake disks.

Nevertheless, as mentioned above, the invention can be applied to any composite material containing carbon, or any other material that is sensitive to oxidation, in particular CMCs having carbon fiber reinforcement or presenting a carbon interphase or a boron nitride (BN) interphase between the reinforcing fibers and the ceramic matrix made of SiC, for example.

A first step 10 of the method consists in preparing the composition for application to the surface of the part that is to be protected.

The composition comprises:

a metal diboride powder comprising for the most part (more than 50% by weight) titanium diboride $TiB_2$ in finely divided form, to which there can optionally be added one or more other borides such as aluminum boride $AlB_2$ and/or $AlB_{12}$, and/or silicon bond $SiB_4$ and/or $SiB_6$;

refractory oxides in finely divided powder form capable of producing or forming a silicate glass that is self-healing at the operating temperatures intended for the part, which oxides comprise for the most part boron oxide and silicon oxide;

a resin that is a precursor for a refractory ceramic acting as a binder;

a solvent for the resin; and optionally solid fillers in the form of short fibers or "whiskers", made of ceramic material.

In addition to boron oxide and silicon oxide, the components of the silicate type glass can be oxides for adjusting the temperature range in which the glass presents viscous behavior that is useful for performing the healing function, such as: oxides of alkali elements, $Na_2O$, $K_2O$; oxides of barium or of calcium or of magnesium, BaO, CaO, MgO; alumina $Al_2O_3$; lead monoxide Pbo; an iron oxide; . . . .

Thus, it is possible to use a "PYREX"® glass powder from the US company Corning whose composition is mainly as follows (percentages by weight):

| | |
|---|---|
| $SiO_2$ | 80.60% |
| $B_2O_3$ | 12.60% |
| $Na_2O$ | 4.2% |
| $Al_2O_3$ | 2.25% |
| Cl | 0.1% |
| CaO | 0.1% |
| MgO | 0.05% |
| $Fe_2O_3$ | 0.04% |

Other glasses can be used that are formed mainly of boron and silicon oxides, such as those produced by the German company Schott under the references "8330", "8337B", "8486", and "88656".

The resin constituting a precursor of a refractory ceramic is selected for example from: polycarbosilanes (PCS); precursors of silicon carbide SiC; polytitano-carbosilanes (PTCS) or other derivatives in which titanium is replaced by some other metal (such as zirconium), which SiC-precursor substances are sold in particular by the Japanese company UBE; or other precursors for Si—C—O or Si—C—N systems such as polysilazanes, polysiloxanes, polyvinylsilanes (PVS) or silicone resins.

The resin solvent can be selected, for example, from: xylene, toluene; perchlorethylene; cyclohexane; octane; . . .

The optional additional fillers in the form of short fibers or "whiskers" can be, for example: silicon carbide SiC, e.g. fibers sold under the name "NICALON" by the Japanese company Nippon Carbon, or of alumina $Al_2O_3$, e.g. the $Al_2O_3$ fibers sold by the British company ICI under the name "SAFFIL".

Preferably after being homogenized by stirring, the composition is applied to the surface of the part to be protected, with application being performed, for example, by coating using a paint brush or a spray gun. Application is preferably performed as a plurality of successive coats, e.g. two coats (steps 20 and 40) advantageously separated by a step (30) in which the coating is dried by elimination of the solvent and the resin is cured.

After the solvent has been eliminated by oven drying, the total quantity of composition that is deposited preferably lies in the range 25 milligrams per square centimeter ($mg/cm^2$) to 110 $mg/cm^2$, so as to obtain a coating, after curing, of thickness lying in the range 200 μm to 700 μm.

Curing the resin transforms it into an insoluble polymer which provides cohesion between grains of boride powder, of glass, and any whiskers, and also enables the coating to adhere to the part. Prior to deposition of a following coat, the intermediate curing serves to avoid the previously-deposited coat being dissolved by the solvent contained in the subsequently-deposited coat, and encourages obtaining good uniformity in the final coating.

A final curing step 50 is performed after the last coat has been formed and dried.

The resin is cured in air at a temperature that depends on the nature of the resin, and that is preferably lower than 400° C. With PCS, curing can be performed by raising the temperature to 350° C. in air or in the presence of oxygen.

Heat treatment for ceramizing the polymer that is a precursor of refractory ceramic (i.e. transforming the polymer into a ceramic) can then be performed (step 60) by raising the temperature to above 600° C., for example up to about 900° C., under an inert atmosphere. Nevertheless, ceramization treatment can also be performed in an oxidizing atmosphere, providing it takes place quickly and at a relatively high temperature, e.g. higher than or equal to 800° C., e.g. by flame treatment in air, or by flash oxidation in a furnace in air, or by local heating by inductive coupling with an inductor, when the nature and the shape of the part make that possible. Flame treatment in air can be performed by means of a blow torch, thus making it possible to achieve local control over ceramization.

Performing ceramization before first use of the part makes it possible to obtain sealing and to envisage use at relatively low temperature.

Nevertheless, this heat treatment need not be performed before the part is put into operation, with ceramization then taking place while the part is being used, on being exposed to a temperature that is high enough.

After heat treatment, a part is obtained that is provided with a protective coating comprising a refractory ceramic obtained by ceramizing the precursor, a self-healing stage of the silicate glass type comprising for the most part the oxides $B_2O_3$ and $SiO_2$, together with a filler constituted at least for the most part of grains of $TiB_2$, together optionally with whiskers.

The titanium diboride $TiB_2$ constitutes a regenerator for $B_2O_3$. $B_2O_3$ tends to volatilize on the temperature reaching the range 400° C.–500° C., so by oxidizing at temperatures higher than 550° C., it is the $TiB_2$ which serves to compensate for the loss of $B_2O_3$ by generating $B_2O_3+TiO_2$. The titanium oxide $TiO_2$ is dispersed within the oxides of the silicate glass and contributes to increasing its viscosity while maintaining its healing power.

The boride(s) other than $TiB_2$ and present in minority concentrations are selected, for example, from borides of aluminum or silicon which enable $B_2O_3$ to be generated, and also one or more refractory oxides. When aluminum boride is present, the alumina that is generated while the substance is in use can then react with the silica $SiO_2$ that is present and produce more refractory silico-alumina phases such as mullite ($3Al_2O_3, 2SiO_2$) for example. In addition to reinforcing the refractory nature of the resulting coating, that can improve the ability of the coating to withstand blowing.

The additional fillers in the form of short ceramic fibers or "whiskers" serve to retain the glass when it takes on a viscous state that is too fluid, and they thus improve the ability of the coating to withstand blowing (as applies for example in the diverging portion of a rocket nozzle) and to withstand centrifuging (as occurs for example with brake disks).

The composition of the desired final coating is determined by the composition to be applied to the part, it being understood that the quantity of solvent is adjusted to impart viscosity that is appropriate for application by means of a paint brush or a spray gun.

In a variant of the method, before performing step 20, a prior step is performed of impregnating the part that is to be protected so as to form internal protection against oxidation anchored in the pores of the part. Impregnation is performed by means of a composition containing at least one phosphate, e.g. aluminum phosphate $Al(H_2PO_4)_3$. As described in document U.S. Pat. No. 5,853,821, such impregnation can be performed after treating the part to the core with a solution containing a wetting agent, and then drying. After such impregnation and subsequent drying, heat treatment is performed in an inert atmosphere. After the protective coating of the invention has been applied, a part is obtained that presents both good ability to withstand oxidation at high temperature in a moist atmosphere, and good ability to withstand oxidation at lower temperatures, including in the presence of oxidation catalysts.

It should be observed that depending on the intended application, the composition can be applied over all or a fraction only of the outside surface of a part. For example, with brake disks, the composition need be applied only to surfaces other than the friction surface(s), and with diverging portions for thruster nozzles, the composition need be applied only to the inside surface of the diverging portion.

EXAMPLE 1

In order to verify the effectiveness of a protective coating of the invention, samples of C/C composite were provided with a protective coating under the following conditions and were tested at high temperature (1000° C. or higher) in dry air and in moist air.

The samples were C/C composite blocks comprising carbon fiber reinforcement densified by a matrix of pyrolytic carbon obtained by chemical vapor infiltration.

The following composition was prepared:

| | |
|---|---|
| $TiB_2$ powder: | 320 grams (g) |
| "PYREX"® glass powder: | 83.6 g |
| PCS resin (in the dry, solid state): | 100 g |
| solvent (xylene): | 150 g |

After the mixture had been homogenized, the composition was applied by means of a paint brush over the entire outside surface of each sample, two successive coats being applied with an intermediate drying stage, and in some cases with an intermediate stage of curing the PCS.

After final curing, the samples were subjected to heat treatment to ceramize the PCS by being raised to a temperature of 900° C. in an inert atmosphere. The PCS ceramizing heat treatment was performed prior to testing in order to be able to measure the initial mass of the substrates after heat treatment and to evaluate its variation after exposure to an oxidizing atmosphere. As mentioned above, such ceramizing heat treatment would not be always necessary prior to using protected parts.

Table I below gives the mass m of the composition deposited per unit area for the various samples, together with the relative variation in sample mass as measured after 1 hour (h) of exposure to dry air at 1200° C.:

TABLE I

| Sample | m (mg/cm$^2$) | Intermediate curing | Mass variation (%) |
|---|---|---|---|
| A | 33 | no | −1.6 |
| B | 67 | no | +1.15 |
| C | 104 | no | +1.05 |
| D | 29 | yes | +1 |
| E | 46 | yes | +1.4 |
| F | 102 | yes | +1.9 |

It can be seen that apart from sample A, there is an increase in mass due to TiB$_2$ oxidizing.

This test shows the advantage of making two coats with intermediate curing between the two coats, and also shows the influence of the total thickness of the coating.

Figure 2:
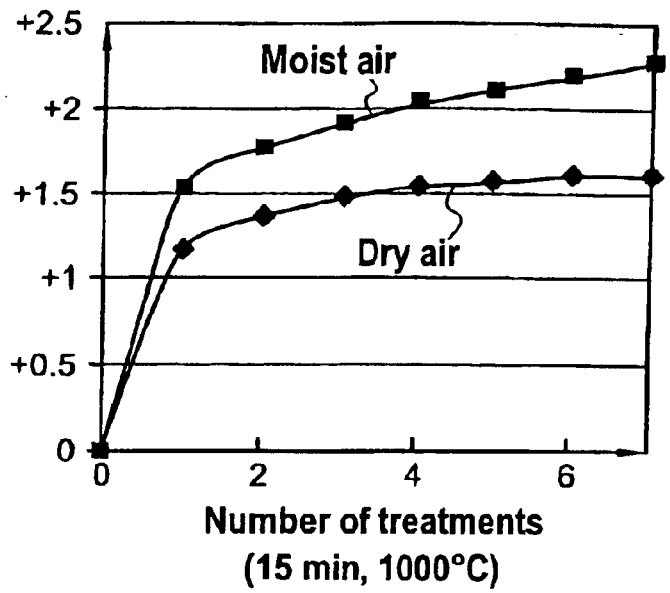
FIGS. 2 to 4 are graphs showing how protective coatings as obtained in accordance with the invention withstand dry and wet oxidizing atmospheres at temperatures of 1000° C. or 1200° C.
Figure 3:
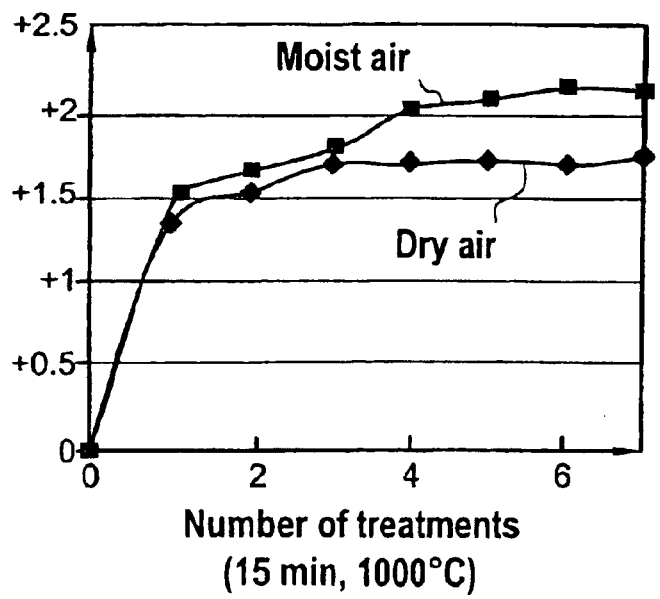

FIG. 2 shows relative mass variation as measured after successive exposures, each of 15 minutes (min) duration, to dry air and to moist air (100% relative humidity at 20° C.) at a temperature of 1000° C. for samples coated with two coats using an intermediate step of curing PCS, while FIG. 3 shows relative mass variation as measured after successive exposures each of 10 min duration to dry air and to moist air at 1200° C. for the same samples.

No loss of mass is observed, which shows the exceptional ability of the coating to withstand a moist atmosphere, in spite of the presence of B$_2$O$_3$.

EXAMPLE 2

C/C composite samples identical to those of Example 1 were provided with a protective coating by applying one or two coats (when two coats were applied there was an intermediate step of curing the first coat) of the following composition:

| | |
|---|---|
| TiB$_2$ powder: | 80 g |
| "PYREX" ® glass powder: | 20.9 g |
| Silicone resin: | 31.25 g |
| Solvent (xylene) : | 31.25 g |

By way of example, the silicone resin used was a resin sold by the German company Chemie under the reference "H62C".

After final curing (heat treatment at 220° C. without a catalyst), the samples were subjected to heat treatment for ceramizing the silicone by being raised to a temperature of 900° C. in an inert atmosphere.

Table II below gives the number of coats deposited for the various samples together with the relative variations in mass variation Δm/m as measured relative to the initial mass m after ceramizing the silicone, after 20 min at 1200° C. in dry air, then after 5 h at 650° C. in dry air, and then after a further 5 h at 650° C. in dry air.

TABLE II

| Sample | Number of coats | 20 min at 1200° C. | 5 h at 650° C. | 5 h at 650 C. ° |
|---|---|---|---|---|
| G | 1 | −0.63 | −1.96 | −4.08 |
| H | 2 | +0.46 | −0.88 | −1.08 |

This example confirms the effectiveness of the coating, particularly when it is made up of two coats with intermediate curing.

EXAMPLE 3

C/C composite samples identical to those of Example 1 were provided with a protective coating by applying one coat of the composition of Example 2 (samples I and J) or two coats (samples K and L), in which case there was intermediate drying and curing of the first coat.

After final curing, the samples were subjected to heat treatment to ceramize the silicone at 900° C.

Figure 4:
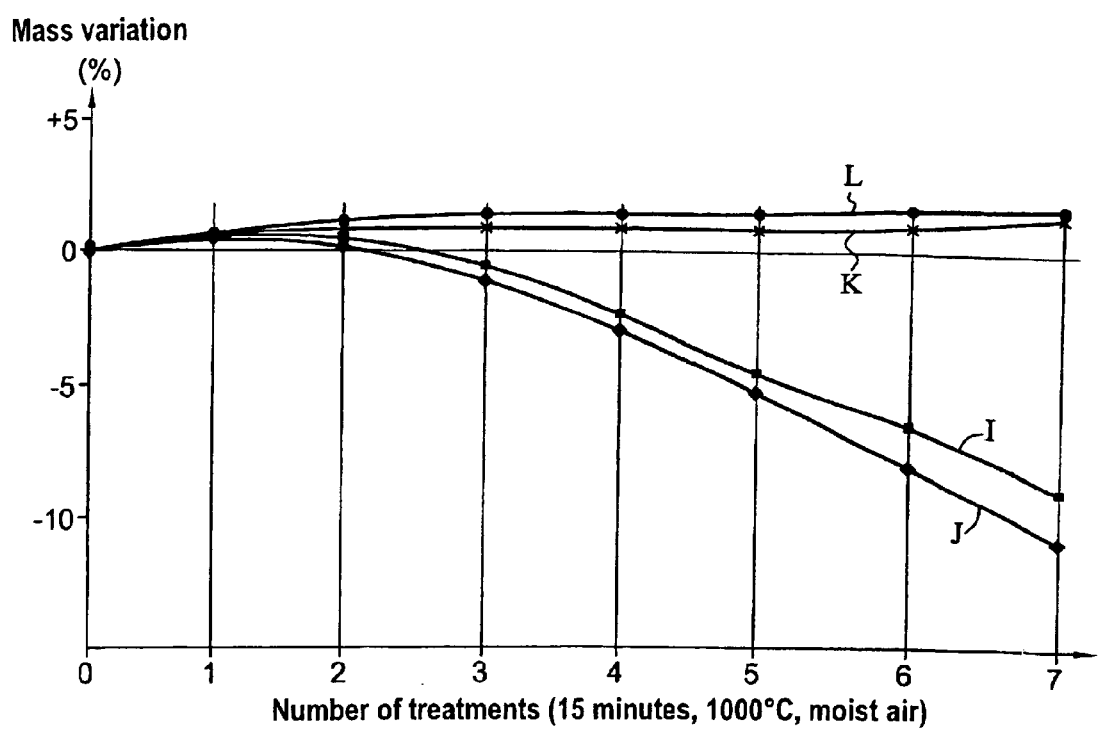

FIG. 4 shows mass variation as measured relative to the initial mass, after curing the silicone, for the various samples I, J, K, and L as exposed for successive 15-min periods at 1000° C. to moist air (100% relative humidity at 20° C.).

Again it can be seen that the coating is effective, in particular when deposited in the form of two coats with intermediate curing, since no mass loss was then observed after 105 min.

EXAMPLE 4

C/C composite samples were provided with a protective coating comprising two cured coats using the composition of Example 1.

The samples were tested in an installation simulating the operating conditions to be found in a cryogenic engine (gas mixture comprising 75% H$_2$O+25% H$_2$, by volume).

Table III below gives relative mass variations as measured for the various cycles, one of which was repeated.

TABLE III

| | Mass variation (%) | | |
|---|---|---|---|
| Cycle | 1 cycle | 2 cycles | 3 cycles |
| I. Temperature: 1000° C. Absolute pressure: 60 mbar Duration: 640 s | +1.8 | | |
| II. Temperature: 1300° C. Absolute pressure: 65 mbar Duration: 670 s | +1.5 | | |
| III. Temperature: 1400° C. Absolute pressure: 210 mbar Duration: 670 s | +1.05 | +2.08 | +1.29 |
| IV. Temperature: 1500° C. Absolute pressure: 210 mbar Duration: 670 s | −1.18 | | |

By way of comparison, a cycle I was also performed on a C/C composite sample having no protective coating. Relative mass variation of −1.4% was measured.

This example shows the effectiveness at high temperature of this protection under conditions that are moist and in the presence of hydrogen H$_2$.

EXAMPLE 5

Identical C/C composite samples were provided with protective coatings using the three methods below:
  samples M: using the method of Example 2, with final ceramization at 900° C.;
  samples N: using the method of Example 1 of document U.S. Pat. No. 5,853,821 consisting in immersing the C/C composite samples in a tank stirred by ultrasound and containing an 0.5% by weight solution in water of a wetting agent sold under the name "Marlophen 89" by the German company Hüls, and then after drying in applying a 50% by weight solution of aluminum phosphate Al(H$_2$PO$_4$)$_3$ in water by using a paint brush; after drying, heat treatment was performed under nitrogen with temperature being raised progressively up to 700° C.; and samples O: by successively applying the protection applied to samples N in accordance with U.S. Pat. No. 5,853,821 followed by the protection applied to the samples M in accordance with the invention.

Table IV below shows the relative mass losses as measured during the various tests, some of the tests being performed under conditions of oxidation catalyzed by the presence of potassium acetate.

TABLE IV

| Condition | Presence of K acetate | Samples M | Samples N | Samples O |
|---|---|---|---|---|
| 5 × 5 h cycles at 650° C. | no | −6.9 | −4.1 | −2.1 |
| 5 × 5 h cycles at 650° C. | yes | −23.9 | −3.4 | −3.3 |
| 5 × 5 h cycles at 650° C. + 10 min at 1200° C. + 2 × 5 h cycles at 650° C. | no | −2.0 | −11.75 | −3.4 |
| 5 × 5 h cycles at 650° C. + 10 min at 1200° C. + 2 × 5 h cycles at 650° C. | yes | −47.8 | −43.20 | −18.0 |

In the absence of final ceramization treatment of the flash-oxidizer type which provides sealing, this test shows that the protection of the invention presents poor effectiveness at relatively low temperature, in particular in the presence of an oxidation catalyst, when compared with its ability to withstand high temperatures in a moist atmosphere. In contrast, the protection provided in application of U.S. Pat. No. 5,853,821 is effective at relatively low temperature, including in the presence of an oxidation catalyst. Tests on samples O show the effect of the synergy provided by associating both types of protection.

What is claimed is:

1. A method of protecting a composite material part against oxidation, the method comprising: applying on the part a composition containing a mixture of at least one bonds in powder form, at least one vitreous refractory oxide in powder form having healing properties by forming a glass, and a binder comprising a resin that is a precursor for a refractory ceramic; and curing the resin, wherein said boride powder is constituted for the most part by titanium diboride TiB$_2$, and said powder of at least one vitreous refractory oxide comprises for the most part a borosilicate mixture.

2. A method according to claim 1, wherein the binder comprises a ceramic precursor polymer selected from: polycarbosilanes, polytitanocarbosilanes, polysilazanes, polyvinylsilanes, and silicone resins.

3. A method according to claim 2, wherein the curing is performed at a temperature lower than 400° C.

4. A method according to claim 1, wherein a composition is applied to the part, which composition, after curing, forms a coat having a thickness lying in the range 200 μm to 700 μm.

5. A method according to claim 2, wherein the composition is applied to the part as a plurality of successive coats, with intermediate curing.

6. A method according to claim 1, including a heat treatment step of ceramization in which the precursor is transformed into a refractory ceramic.

7. A method according to claim 6, wherein the heat treatment step is performed at a temperature higher than 600° C. in an inert atmosphere.

8. A method according to claim 6, wherein the heat treatment step is performed at a temperature higher than or equal to 800° C. in an oxidizing atmosphere.

9. A method according to claim 8, wherein the heat treatment is performed by one of the methods consisting of: flash oxidation in a furnace, flame treatment in air, and local heating by inductive coupling.

10. A method according to claim 1, for protecting a carbon/carbon composite material part, wherein the composition is applied after forming a refractory undercoat.

11. A method according to claim 10, wherein a refractory undercoat is formed containing silicon carbide.

12. A method according to claim 1, comprising a prior step of impregnating the part with a composition containing at least one phosphate.

13. A method according to claim 1, wherein the composition further comprises a solvent for the ceramic-precursor resin, thereby adjusting the viscosity of the composition.

14. A method according to claim 13, wherein the composition is applied by coating or by spraying, and then eliminating the solvent by drying.

15. A method according to claim 1, wherein the composition further includes filler fibers of refractory material.

16. A method according to claim 1, wherein said boride powder further includes at least one boride selected from borides of aluminum and of silicon.

17. A composite material part provided with a coating for protection against oxidation, the coating comprising a continuous phase of refractory ceramic, a self-healing phase formed of at least one refractory oxide, and a filler formed of at least one refractory boride, wherein the self-healing phase comprises for the most part a borosilicate system, and said filler is formed for the most part by titanium diboride TiB$_2$.

18. A part according to claim 17, wherein said filler further includes at least one boride selected from the borides of aluminum and of silicon.

19. A part according to claim 17, wherein the coating further include filler fibers of refractory material.

20. A part according to claim 17, the part being provided with an internal coating for protection against oxidation, the internal coating comprising at least one phosphate.

21. A part according to claim 17, constituting a friction piece of carbon/carbon composite material.

22. A part according to claim 21, the part being provided with a protective coating on its surfaces other than its friction surface(s).

23. A part according to claim 17, constituting a diverging portion for a rocket engine nozzle having at least its inside surface provided with a coating for protection against oxidation.

* * * * *

UNITED STATES PATENT AND TRADEMARK OFFICE
CERTIFICATE OF CORRECTION

PATENT NO. : 6,740,408 B2
DATED : May 25, 2004
INVENTOR(S) : Jacques Thebault et al.

It is certified that error appears in the above-identified patent and that said Letters Patent is hereby corrected as shown below:

<u>Column 4,</u>
Line 31, "Pbo" should read -- PbO --; and

<u>Column 9,</u>
Line 41, "bonds" should read -- boride --.

Signed and Sealed this

Twenty-sixth Day of April, 2005

JON W. DUDAS
*Director of the United States Patent and Trademark Office*